(12) United States Patent
Seo

(10) Patent No.: US 9,757,645 B2
(45) Date of Patent: Sep. 12, 2017

(54) GAME TYPE UNLOCKING METHOD FOR TOUCH SCREEN INFORMATION DEVICE

(71) Applicant: RSUPPORT CO., LTD., Seoul (KR)

(72) Inventor: Hyungsu Seo, Gyeonggi-Do (KR)

(73) Assignee: RSUPPORT CO., LTD., Seoul (KR)

( * ) Notice: Subject to any disclaimer, the term of this patent is extended or adjusted under 35 U.S.C. 154(b) by 358 days.

(21) Appl. No.: 14/039,892

(22) Filed: Sep. 27, 2013

(65) Prior Publication Data

US 2014/0100026 A1    Apr. 10, 2014

(30) Foreign Application Priority Data

Oct. 10, 2012    (KR) ........................ 10-2012-0112549

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/40* | (2014.01) |
| *A63F 13/42* | (2014.01) |
| *A63F 13/2145* | (2014.01) |
| *A63F 13/73* | (2014.01) |
| *G06F 1/16* | (2006.01) |

(Continued)

(52) U.S. Cl.
CPC .......... *A63F 13/10* (2013.01); *A63F 13/2145* (2014.09); *A63F 13/42* (2014.09); *A63F 13/73* (2014.09); *G06F 1/1694* (2013.01); *G06F 3/04883* (2013.01); *G06F 21/36* (2013.01); *H04W 12/06* (2013.01); *A63F 13/88* (2014.09); *A63F 13/92* (2014.09); *G06F 2200/1637* (2013.01); *H04W 88/02* (2013.01)

(58) Field of Classification Search
CPC .......... A63F 13/10; A63F 13/73; A63F 13/45; A63F 13/42; A63F 13/92; A63F 13/88; H04W 12/06; H04W 88/02; G06F 21/36; G06F 3/04883; G06F 1/1694; G06F 2200/1637
USPC ........................................... 463/29
See application file for complete search history.

(56) References Cited

U.S. PATENT DOCUMENTS

2004/0130525 A1\* 7/2004 Suchocki ...................... 345/156
2007/0150826 A1\* 6/2007 Anzures et al. .............. 715/772
(Continued)

FOREIGN PATENT DOCUMENTS

| KR | 10-2011-0032147 A | 3/2011 |
| KR | 10-2011-0090642 A | 8/2011 |
| KR | 10-2012-0100045 A | 9/2012 |

*Primary Examiner* — Omkar Deodhar
*Assistant Examiner* — Wei Lee
(74) *Attorney, Agent, or Firm* — Mintz Levin Cohn Ferris Glovsky and Popeo, P.C.; Kongsik Kim; Colleen H. Witherell

(57) ABSTRACT

The present invention relates to a method of unlocking an information device, such as a smart phone, applying a touch screen as an input-output means, in which a game progressed by a gesture or the like performed on the touch screen 11 is implemented on an unlock screen, and the locking state of the corresponding information device is released as the game is progressed. Through the present invention, it is possible to induce interest a user and satisfy an aesthetic sense of the user in the unlocking process by getting out of a stereotyped conventional method of unlocking a touch screen 11 information device, which is focused only on functional factors.

9 Claims, 13 Drawing Sheets

(51) Int. Cl.
    *G06F 21/36*     (2013.01)
    *G06F 3/0488*     (2013.01)
    *H04W 12/06*     (2009.01)
    *A63F 13/92*     (2014.01)
    *A63F 13/88*     (2014.01)
    *H04W 88/02*     (2009.01)

(56) References Cited

U.S. PATENT DOCUMENTS

| | | | |
|---|---|---|---|
| 2010/0045608 A1* | 2/2010 | Lessing | G06F 3/04883 345/173 |
| 2011/0169748 A1* | 7/2011 | Tse et al. | 345/173 |
| 2011/0271181 A1 | 11/2011 | Tsai et al. | |
| 2012/0077557 A1* | 3/2012 | Miki | 463/3 |
| 2013/0079079 A1* | 3/2013 | Bouchard et al. | 463/9 |

* cited by examiner

GAME TYPE UNLOCKING METHOD FOR TOUCH SCREEN INFORMATION DEVICE

CROSS-REFERENCE TO RELATED APPLICATION

The present application claims priority to Korean Application No. 10-2012-0112549 filed on Oct. 10, 2012, which is incorporated herein by reference.

TECHNICAL FIELD

The present invention relates to a method of unlocking an information device such as a smart phone applying a touch screen as an input-output means, in which a game progressed by a gesture or the like performed on the touch screen 11 is implemented on an unlock screen, and a locking state of the corresponding information device is released as the game is progressed.

RELATED ART

An information device such as a smart phone, a tablet PC or the like applying a touch screen 11 as an input-output means is provided with various types of means for unlocking the touch screen 11 in order to limit unnecessary input errors occurred in a standby state.

Unlocking a touch screen 11 information device generally means that if a user releases a blackout state by pressing a physical button of the corresponding information device such as a home button, a power button or the like while being in a standby state, i.e., a state in which the blackout state of the touch screen 11 is maintained and, at the same time, any input operation is not performed at all although a touch is sensed, an unlock screen is output on the touch screen 11, and if the user inputs a password or performs a specific gesture on the touch screen 11 where the unlock screen is output, the locking state is released, and an input is performed according to touch handling on the touch screen 11.

Specific execution methods of unlocking the touch screen 11 information device through password input may be divided into a simple method of inputting a formalized password such as a digit string or a character string and an interactive method of outputting a question on the unlock screen and answering the question by a user, and both of them are a method of unlocking an information device when a user inputs information matching to a predetermined condition. These methods can be regarded to be the same as that of a technique for authenticating a user or preventing unauthorized use through password input, which is conventionally used in operation of an information device and throughout the information communication field.

Although unlocking an information device through password input is advantageous from the aspect of security for preventing unauthorized use of the information device by other people, it is inconvenient to input a password formed in a digit or character string whenever unlocking is handled, and such an inconvenience is intensified furthermore in a portable information device such as a smart phone or the like which frequently performs the unlock handling.

Therefore, developed is a gesture type unlocking method capable of unlocking an information device further intuitively and promptly, in which locking is released if a user performs a specific gesture on the touch screen 11 on which the unlock screen is output, and a representative method thereof is disclosed in U.S. Pat. No. 7,657,849, which is referred to as so-called 'slide to unlock'.

As shown in FIG. 3, the U.S. Pat. No. 7,657,849 is implemented in a method of unlocking an information device by sensing a touch on a user interface object output on the unlock screen and sensing a drag gesture of moving the touch point along a predetermined path while maintaining the touch.

The unlocking method of a 'slide to unlock' type is advantageous in that even a user unfamiliar with using an information device may easily and promptly handle the information device since the required gesture is intuitive and simple. However, since the gesture required for unlocking is too simple, the unlocking may be easily performed by an unconscious touch of the user, and since the unlocking gesture may be easily grasped only through the unlock screen, it is difficult to prevent unauthorized use of the information device by other people.

Therefore, as a method referred to as so-called pattern unlock, developed is a method of unlocking an information device which releases a locking state if a shape configured of a series of touch points or a moving line of the touch points on the unlock screen is matched to a predetermined condition, and examples thereof are disclosed in Korean Laid-opened Patent No. 2009-58875 and 2012-20662 as shown in FIGS. 2 and 3, respectively.

Since the unlocking method of a pattern unlock type requires a further complicated gesture compared with the 'slide to unlock' type described above in performing an unlocking function and, in addition, the required gesture cannot be grasped only through the unlock screen, unnecessary unlocking by an unconscious touch of a user and unauthorized use of the information device by other people may be effectively prevented.

As described above, although a variety of techniques for securing user convenience and improving security are developed and used in relation to unlocking a touch screen 11 information device, conventional unlocking methods including the 'slide to unlock' and the 'pattern unlock' are techniques developed focusing only on the functional aspect of unlocking regardless of a specific execution method and provide users with a stereotyped, dull and boring handling environment, and entertainment factors for inducing interest of a user and aesthetic factors for expressing personality of the user cannot be expected at all.

SUMMARY

Therefore, the present invention has been made in view of the above problems, and it is an object of the present invention to provide factors for inducing interest of a user and satisfying an aesthetic sense of the user in the process of unlocking a touch screen 11 information device and, at the same time, provide a function for preventing unauthorized use of the corresponding information device.

Another object of the present invention is to allow a user to be accustomed to gestures needed for handling a touch screen 11 information device without reluctance through the unlocking behaviors frequently performed while using the touch screen 11 information device.

The present invention is to accomplish the above objects, and in a method of unlocking an information device applying a touch screen 11 as an input-output means, a game type unlocking method of a touch screen 11 information device includes the steps of: releasing a blackout state of the touch screen 11 and executing a game program; outputting a movable object 21 and setting a target object 22 on the touch screen 11, by the game program; moving the movable object 21 according to a handling signal input into the information device, by the game program; and if the movable object 21 arrives at the target object 22, releasing a locking state of the corresponding information device, and a game type unlocking method of a touch screen 11 information device includes the steps of: releasing a blackout state of the touch screen 11 and executing a game program; outputting a movable object 21 and a driving object 25 and setting a target object 22 on the touch screen 11, by the game program; modifying the driving object 25 and moving the movable object 21 according to a handling signal input into the information device, by the game program; and if the movable object 21 arrives at the target object 22, releasing a locking state of the corresponding information device.

In addition, a game type unlocking method of a touch screen 11 information device includes the steps of: releasing a blackout state of the touch screen 11 and executing a game program; outputting unit objects 23 on the touch screen 11, by the game program; moving, rotating or inverting the unit objects 23 according to a handling signal input into the information device, by the game program; and if an assembly of the unit objects 23 satisfies a target state, releasing a locking state of the corresponding information device.

In addition, in a game type unlocking method of a touch screen 11 information device, a hot key 26 is set on the touch screen 11, and if a touch on the hot key 26 is sensed, the game program immediately moves the movable object 21 to the target object 22, or the game program immediately assembles the movable objects 21 into a target state. In addition, in a game type unlocking method of a touch screen 11 information device, the game program also outputs a disturbance object 27 on the touch screen 11.

DETAILED DESCRIPTION

The preferred embodiments of the invention will be hereafter described in detail, with reference to the accompanying drawings.

Figure 1:
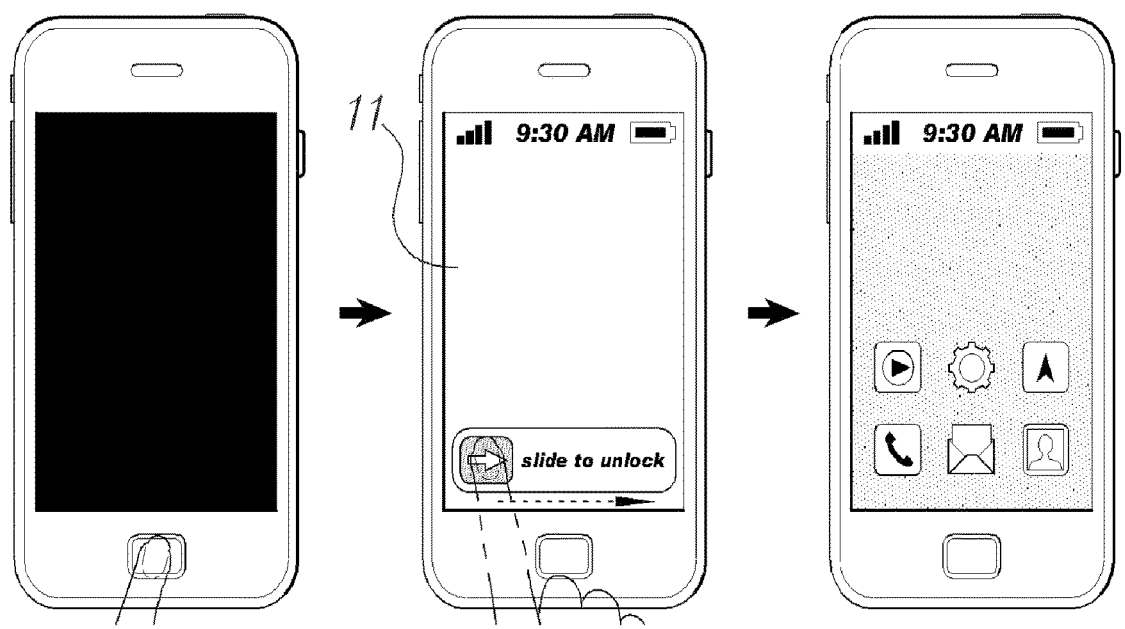
FIGS. 1 to 3 are views respectively showing a method of unlocking a touch screen information device of the prior art.
Figure 2:
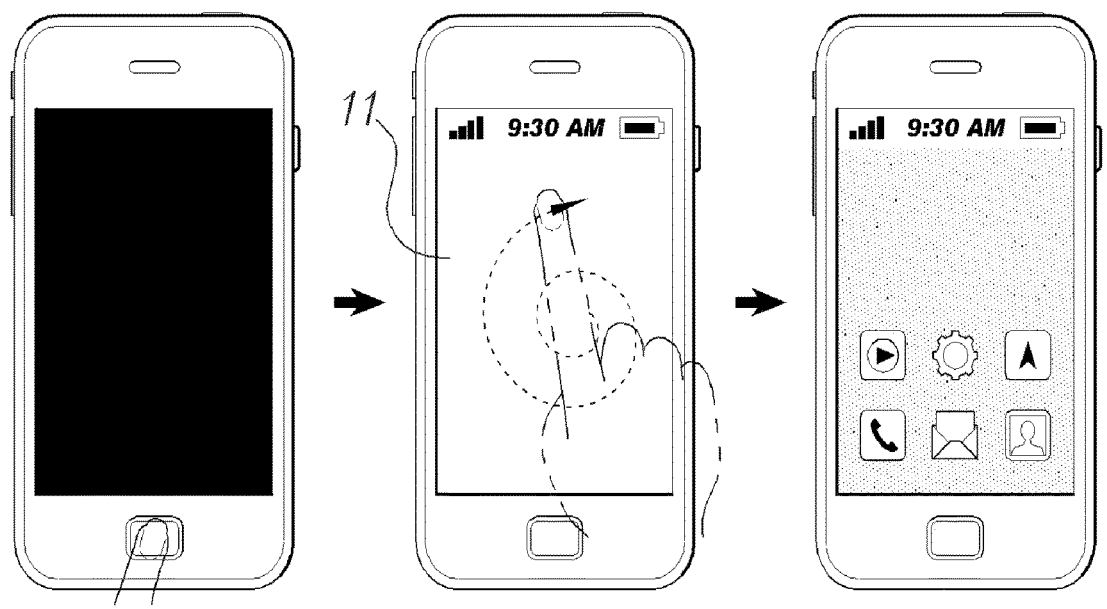
Figure 3:
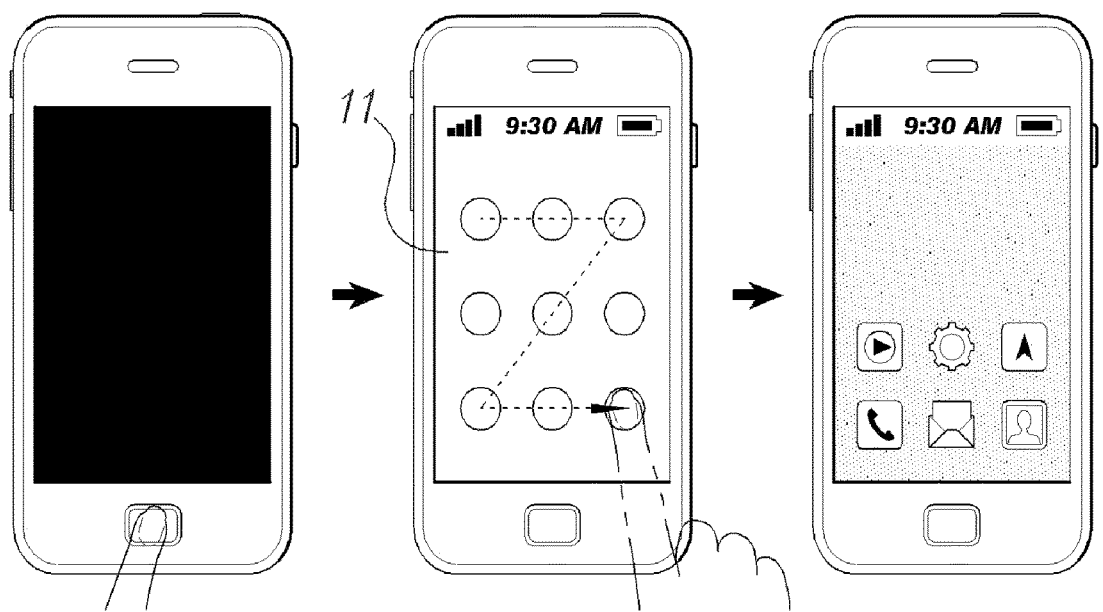
Figure 4:
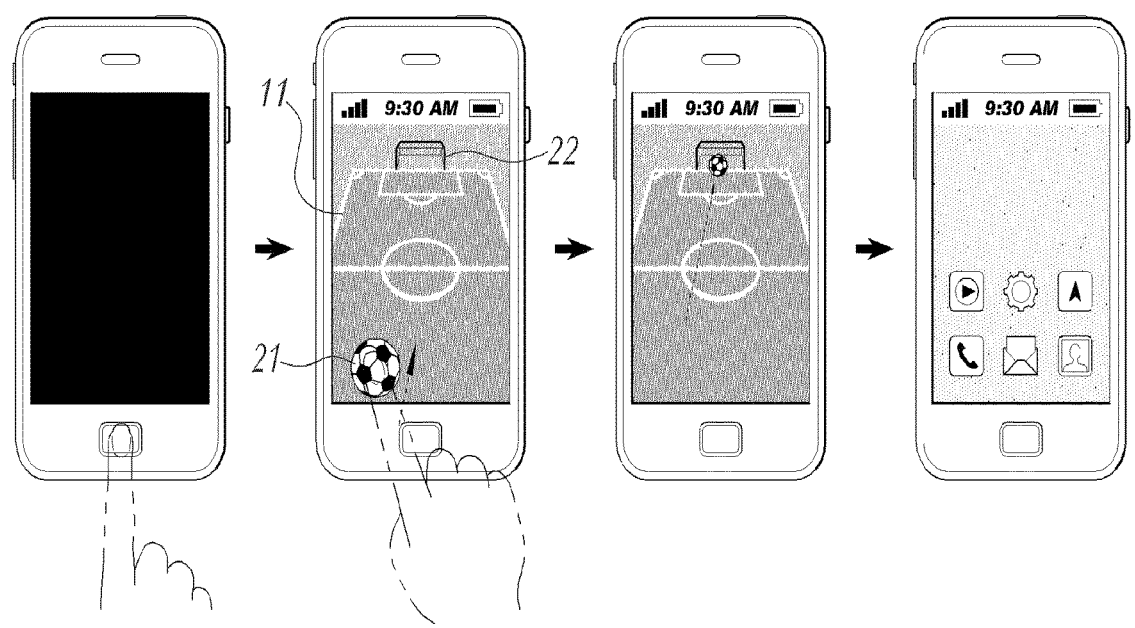
FIG. 4 is a view showing a method of unlocking a touch screen information device through an embodiment of the present invention to which a movable object is applied.

First, FIG. 4 is a view showing an embodiment of the present invention to which a movable object 21 is applied, and in the embodiment shown in the figure, a soccer game is implemented on the touch screen 11, and a soccer ball and a goal are set as a movable object 21 and a target object 22, respectively.

As shown in FIG. 4, an unlocking method of a touch screen 11 information device according to the present invention starts to operate when a blackout state of the touch screen 11 is released and a game screen is output by executing a game program.

That is, if a user presses a physical button of a corresponding information device, such as a home button or a power button, the operating system of the information device releases the blackout state and, at the same time, executes a game program installed in the information device in the form of a module of the corresponding operating system or an application program.

If the game program is executed, as shown in FIG. 4, the game program outputs the movable object 21 and sets the target object 22 on the touch screen 11, and although the movable object 21 and the target object 22 are simultaneously output on the same screen in the embodiment shown in the figure, the movable object 21 and the target object 22 may not be simultaneously output and may be sequentially output while the game is progressed, depending on the type of an implemented game.

If a user handles an input means of the corresponding information device after the movable object 21 is output on the touch screen 11 by the game program, the game program moves the movable object 21 according to handling signals input into the information device, and, as shown in FIG. 4, the movable object 21 may move if the user performs a specific gesture on the touch screen 11 on which the movable object 21 is output.

In the embodiment shown in FIG. 4, a user may intuitively handle the soccer ball, i.e., the movable object 21, as if impacting the soccer ball by performing a gesture of rapidly moving a touch point for a short moment, which is also referred to as a flick, at the output point of the movable object 21, and the user may control the moving path of the movable object 21 by adjusting the direction and speed of the flick gesture.

If the movable object 21 moving according to the input handling signals arrives at the target object 22, i.e., the soccer ball is put in the goal in the embodiment shown in FIG. 4, the locking state of the corresponding information device is released, and then the corresponding information device can be practically used.

As described above, since a user enjoys a game and unlocking is accomplished as a result of the game, it is possible to induce interest a user and satisfy an aesthetic sense of the user in the process of unlocking a touch screen 11 information device by getting out of a stereotyped conventional unlocking method focusing only on functions.

FIGS. 5 to 8 show, for example, various types of games applying a movable object 21, which can be implemented in the process of performing the present invention. A user controls movement of the movable object 21 by performing a specific gesture on the touch screen 11 or using an input means such as an acceleration sensor mounted on a corresponding information device.

Figure 5:
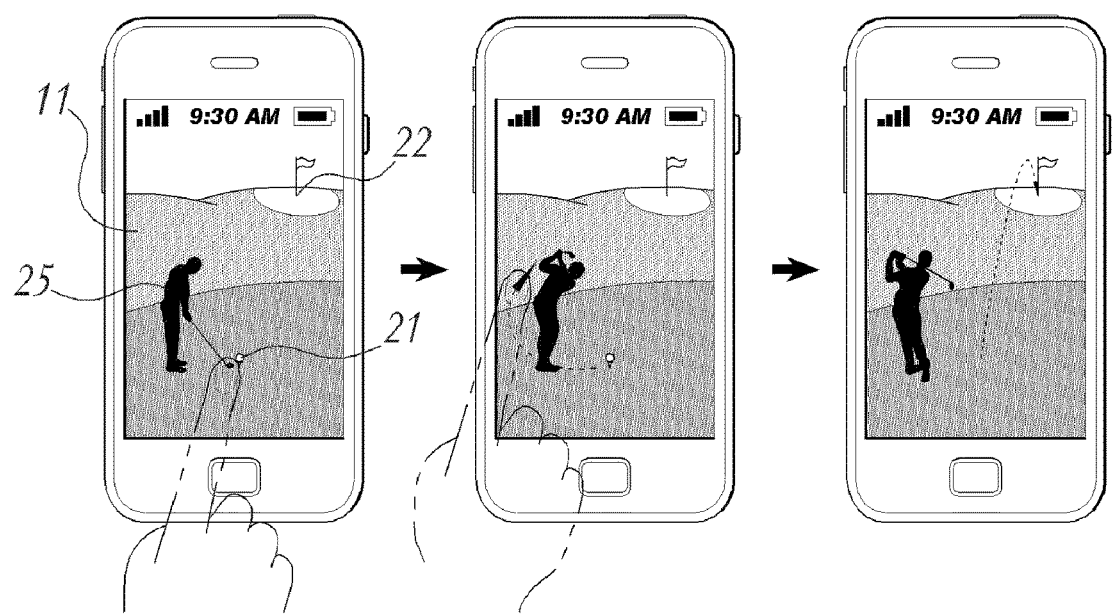
FIGS. 5 to 8 are exemplary views showing various game type touch screens in embodiments of the present invention to which a movable object is applied.

FIG. 5 shows a situation implementing a golf game in the process of performing the present invention, and, at this point, a golf ball and a hole may be set as a movable object and a target object 22.

Although a method of impacting the golf ball itself using a flick gesture, like the soccer game of FIG. 4, may be considered as a simplest handling method for moving the golf ball, i.e., the movable object, interest of a user may not be induced in this case since a sense of reality is lowered. Therefore, it is preferable to output a golf club or a golfer on the touch screen 11 as a driving object 25 as shown in FIG.

5 and generate an effect of hitting the movable object 21 using the driving object 25 if the user handles the driving object 25.

To this end, if the user handles the driving object 25 in a method of performing a gesture on the driving object 25 of the touch screen 11 after performing the step of outputting the movable object 21 and the driving object 25 on the touch screen 11 and setting a target object 22, the game program modifies the driving object 25 and moves the movable object 21 according to input handling signals.

That is, the user does not directly handle the movable object 21 on the touch screen 11, but handles the driving object 25, and if the movable object 21 moves and arrives at the target object 22 as a result of handling the driving object 25, the locking state of the corresponding information device is released.

In the embodiment applying the golf game of FIG. 5, the game may be progressed such that if a gesture of dragging the golf club, i.e., the driving object 25, back in a direction reverse to the hitting direction to form an arc and quickly releasing the touch state, a motion of the driving object 25 hitting the golf ball is output, and the golf ball moves. The flying direction of the golf ball may be controlled according to the length and direction of the dragging.

As described above, a method of hitting or shooting a movable object 21 by dragging a driving object 25 in a reverse direction and quickly releasing the touch state may be used in a shooting game in which a projectile such as a bulletin, an arrow or the like is applied as a movable object, as well as a sports game such as the golf game as shown in FIG. 5.

Figure 6:
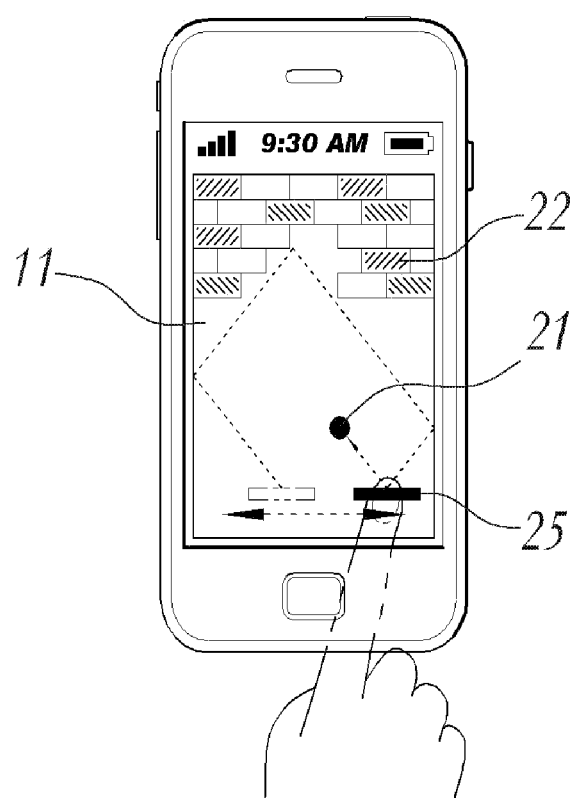
Figure 7:
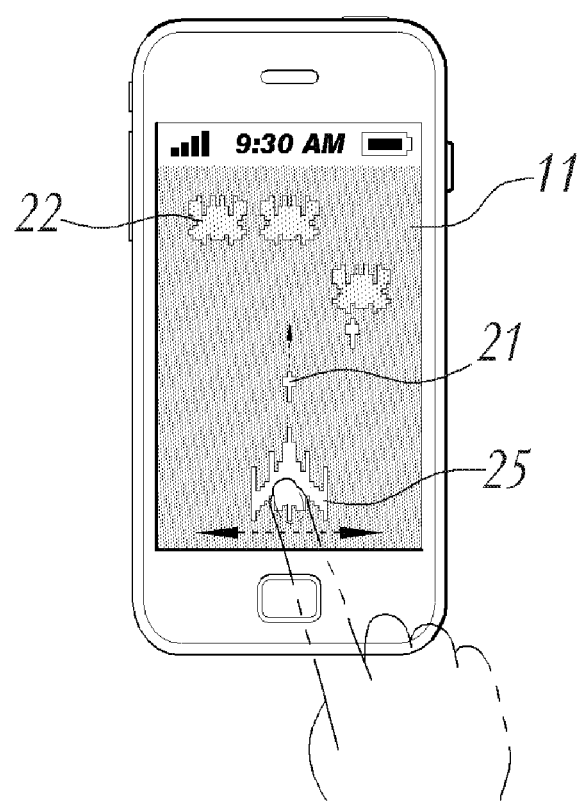

In addition, another example of the driving object 25 is a reflector reflecting a movable object 21 in a reflection type game such as a breakout game shown in FIG. 6 or a flight object shooting movable objects 21 in a flight shooting game shown in FIG. 7, and these driving objects 25 reflects or shoots the movable objects 21 while moving by a drag gesture of a user.

Figure 8:
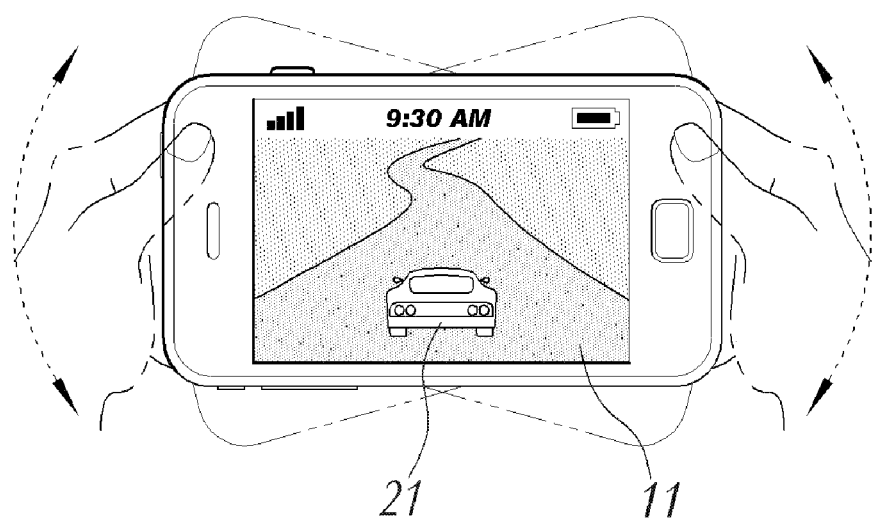

FIG. 8 shows an example of using an acceleration sensor mounted on an information device, not the touch screen 11, as an input means, in which a user controls the movable object 21 by performing a motion of tilting or shaking a corresponding information device, and, as shown in the figure, this can be applied to a racing game or a flight simulation game.

When the racing game or the flight simulation game is applied to the present invention, a finish line, a landing point or the like may be set as a target object 22, and, in this case, the target object 22 is not output on the touch screen 11 in the initial stage of the game program, and the target object 22 appears as the movable object 21 approaches the target object 22 as the game is progressed.

As described above, in the embodiments of the present invention to which the movable objects 21 are applied as shown in FIGS. 4 to 8, various types of games such as the shooting game or the racing game, as well as sports games on the subject of ball games such as soccer, basketball, bawling, golf, baseball, table tennis, and the like, may be implemented.

Figure 9:
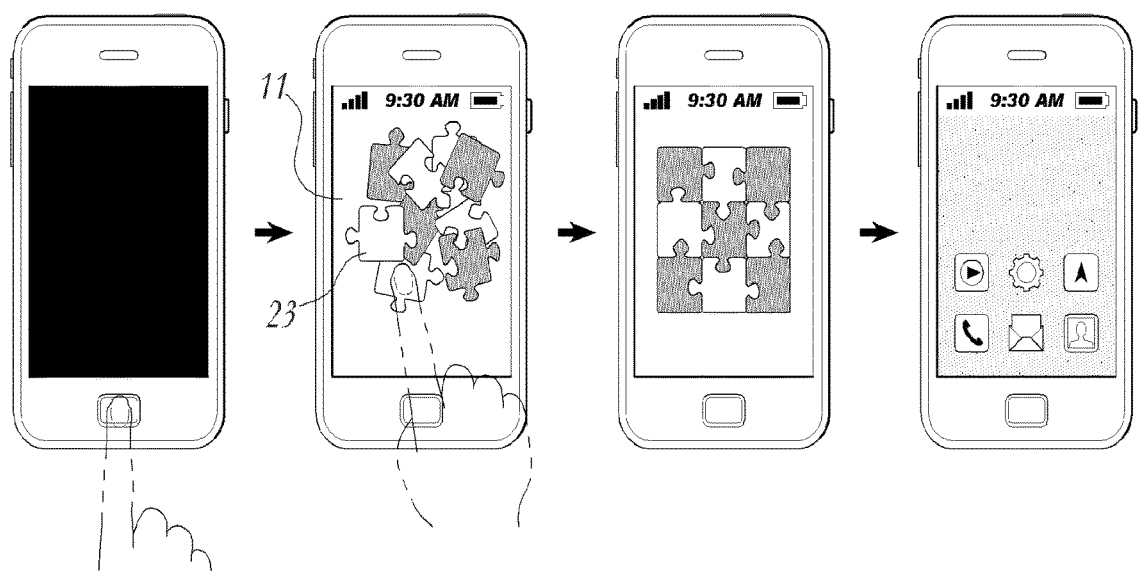
FIG. 9 is a view showing a method of unlocking a touch screen information device through an embodiment of the present invention to which a unit object is applied.

FIG. 9 is a view showing an embodiment of the present invention to which a unit object 23 is applied. In the embodiment shown in the figure, a puzzle game is implemented on the touch screen 11, and a puzzle piece is set as a unit object 23.

As shown in FIG. 9, if a blackout state of the touch screen 11 is released and, at the same time, a game program installed in the corresponding information device is executed by handling the home button or the power button by a user, the game program outputs a plurality of unit objects 23 on the touch screen 11.

Thereafter, an assembly of the unit objects 23 is configured as the game program moves, rotates and inverts the unit objects 23 according to handling signals input into the information device, and if the assembly of the unit objects 23 satisfies a target state, i.e., the puzzle is completed, the locking state of the information device is released, and then the corresponding information device can be practically used.

Operations such as movement, rotation and inversion of the unit objects 23 on the touch screen 11 may be performed by an independent or associated gesture of drag, tap, flick and the like. For example, simple movement of the unit object 23 is performed through a drag gesture, and a unit object 23 rotates clockwise or counterclockwise at a right angle when a tap gesture of lightly touching the corresponding unit object 23 is performed once, and a corresponding unit object 23 is inverted when a flick gesture is performed.

Such a game applying the unit objects 23 may be applied to the Solitaire game, i.e., a single player card game, as well as modified puzzle games such as Tetris and the like, in addition to classic puzzle games such as the jigsaw puzzle shown in FIG. 9.

When a Tetris type game is implemented in the process of performing the present invention, a tetromino or a pentomino, which is a polygon configured by combining a plurality of squares, is set as a unit object 23, i.e., a basic element of the Tetris type game, and the game is progressed as the unit objects 23 are moved, rotated and inverted by a gesture performed on the touch screen 11 as described above.

In addition, in a solitaire type game, each card is set as a unit object 23, and if the cards, i.e., the unit objects 23, are arranged according to a preset condition as gestures are input, an assembly of the unit objects 23 assembled in a target state is completed, and thus the locking state of the information device is released.

As described above, since unlocking an information device is performed through a game implemented by a systematic operation of the movable object 21, the target object 22, the driving object 25 and the unit object 23 handled by a gesture on the touch screen 11, it is possible to induce interest a user and satisfy an aesthetic sense of the user in the unlocking process. In addition, a user may be accustomed to various gestures by playing a game which requires agile gestures in the unlocking process frequently performed while using a touch screen 11 information device. However, compared with a conventional unlocking method performed through only simple and intuitive gestures, it takes a relatively long time in handling the information device.

Figure 10:
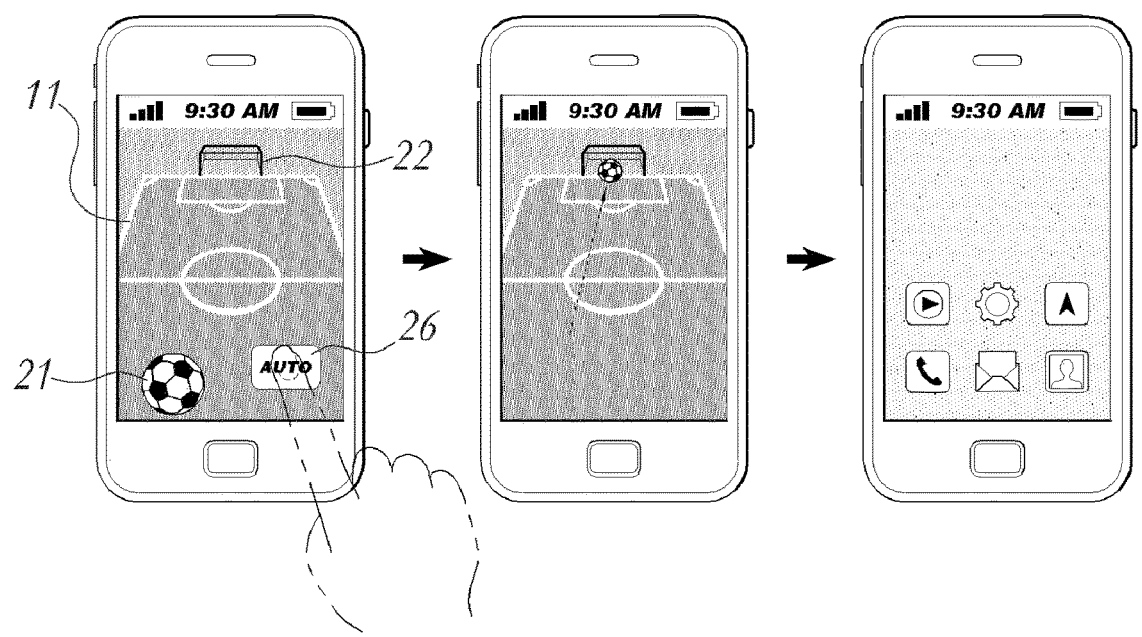
FIGS. 10 and 11 are views respectively showing a method of unlocking a touch screen information device through an embodiment of the present invention to which a hot key is applied.
Figure 11:
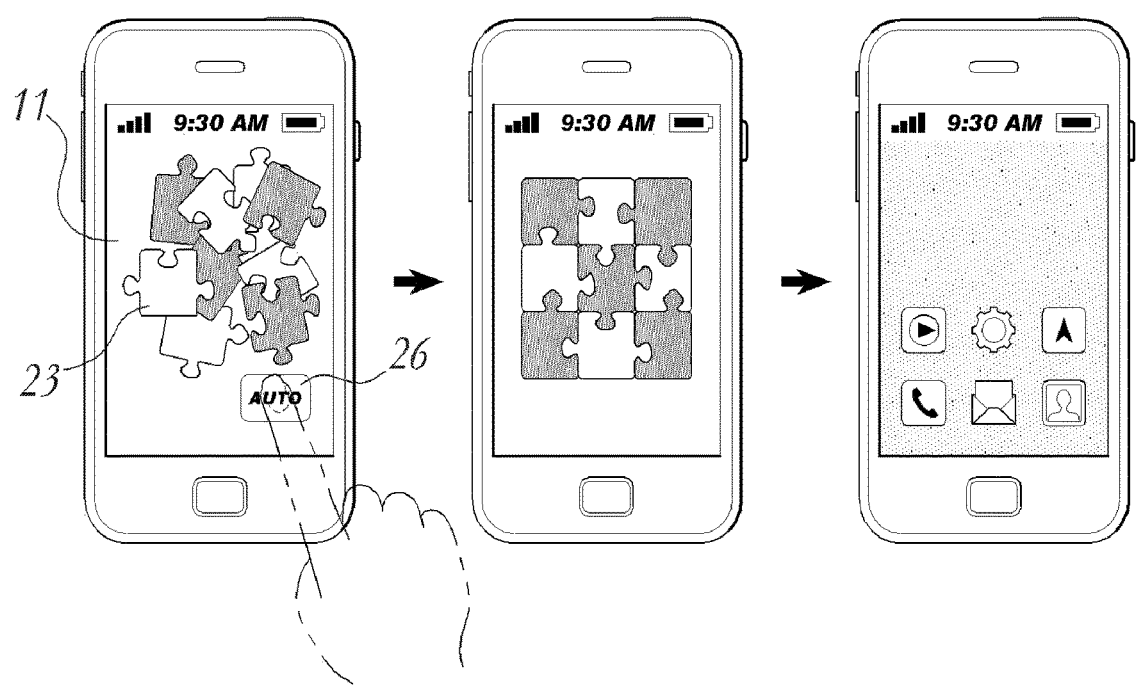

Therefore, in the present invention, a hot key 26 is set on the touch screen 11 on which a game is progressed as shown in FIGS. 10 and 11, and if a user touches the hot key 26 at any time in the process of performing the present invention, the locking state of the corresponding information device is released immediately.

That is, if a touch on the hot key 26 is sensed in an embodiment applying a movable object 21 as shown in FIG. 10, the game program immediately moves the movable object 21 to the target object 22, and if a touch on the hot key 26 is sensed in an embodiment applying unit objects 23 as shown in FIG. 11, the game program immediately assembles the movable objects 21 into a target state, and thus immediate unlocking is accomplished.

Although the hot key 26 is implemented in the form of an icon or a button independently output on the touch screen 11 in the embodiments shown in FIGS. 10 and 11, a movable object 21, a driving object 25, a target object 22 or a unit object 23 output on the touch screen 11 as a game program is executed may be set as a hot key 26 so that the locking state may be released promptly although whatever gesture a user may perform on a corresponding object.

In addition, the hot key 26 may not be output in a form that can be clearly distinguished by appearance, such as an icon, a button, an object or the like as described above, but a specific area within the touch screen 11 recognized only by a true user of the corresponding information device may be set as a hot key 25 so that a security factor for suppressing unauthorized use by other people may be reinforced.

Figure 12:
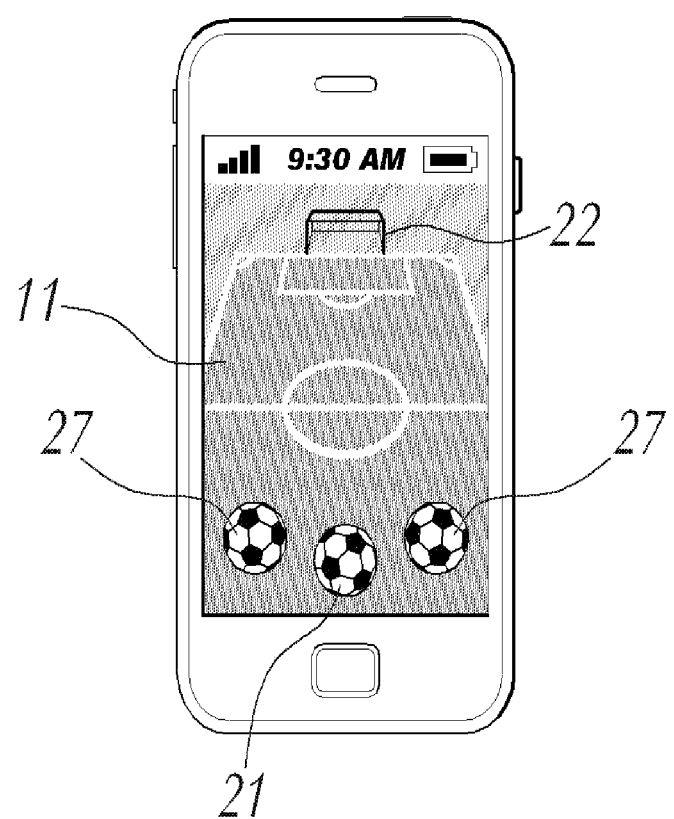
FIGS. 12 and 13 are exemplary views showing touch screens in embodiments of the present invention to which a disturbance object is applied.
Figure 13:
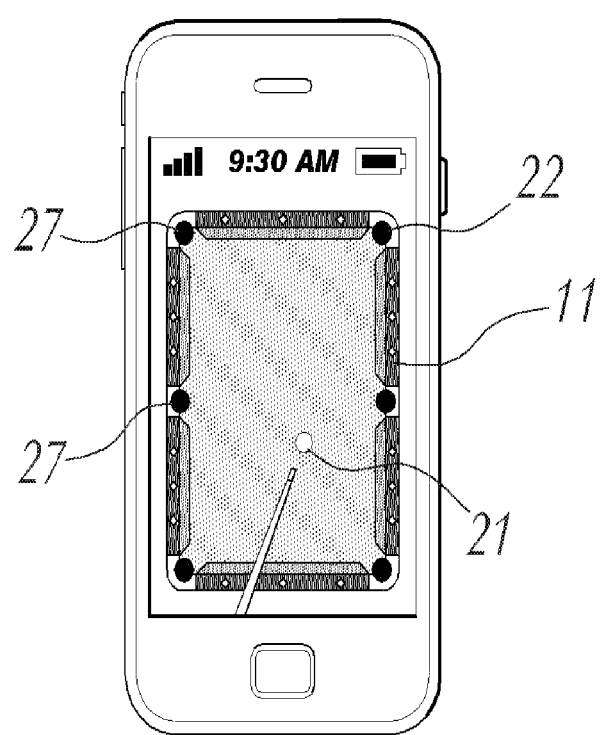

Meanwhile, FIGS. 12 and 13 show embodiments applying a disturbance object 27. Since a disturbance object 27 formed to be identical or similar to a movable object 21 or a target object 22 is output on the touch screen 11 together with the movable object 21 or the target object 22, unauthorized use of the touch screen 11 information device by other people can be prevented.

FIG. 12 is a view showing a state of outputting a disturbance object 27 formed to be the same as the movable object 21 on the touch screen 11, and, in this case, it is operated such that although the disturbance object 27 is moved to the target object 22, the locking state of the corresponding information device is not released, and the locking state is released only when the movable object 21 is moved to the target object 22.

In addition, FIG. 13 shows an embodiment implementing a billiard game in the process of performing the present invention. Some pockets on the billiard table are set as target objects 22, and the other pockets are set as disturbance objects 27. It is operated such that the locking state of the information device is released only when a billiard ball, i.e., a movable object 21, enters into a pocket of a target object 22, and the locking state is maintained when the billiard ball enters into a pocket of a disturbance object 27.

A user may set such a disturbance object 27 in advance, and thus unauthorized use of the information device by other people who do not distinguish the movable object 21 and the target object 22 from the disturbance object 27 can be prevented.

Through the present invention described above, interest of a user is induced and an aesthetic sense of the user is satisfied in the process of unlocking a touch screen 11 information device. In addition, further intensified security can be attained, and a user may be accustomed to various gestures needed for handling the touch screen 11 information device without reluctance.

Through the present invention, it is possible to induce interest a user and satisfy an aesthetic sense of the user in the unlocking process by getting out of a stereotyped conventional method of unlocking a touch screen 11 information device, which is focused only on functional factors.

Furthermore, a user may be accustomed to gestures needed for handling a touch screen 11 information device without reluctance by playing a game which requires relatively agile gestures in the unlocking process frequently performed while using the touch screen 11 information device, and unauthorized use the information device by other people may be prevented by diversifying specific forms and rules of an unlocking game.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of unlocking an information device in which a touch screen is used as an input-output means, the method comprising the steps of:
    releasing a blackout state of a touch screen and executing a game program by a controller while the information device remains in a locking state;
    outputting by the controller, the game program with a movable object and setting a target object on the touch screen;
    adjusting the movable object of the game program based on a variable series of a user specific handling signals input into the information device by a gesture performed on the touch screen; and
    releasing, by the controller, the locking state of the corresponding information device if the movable object moving according to the input of the variable series of user specific handling signal arrives at the target object; and
    releasing, by the controller, the locking state of the corresponding information device based on user identification and engagement of an override mechanism disposed on a specific area within the game program displayed on the touch screen without completion of the input of the variable series of user specific handling signal that indicates that the moveable object arrives at the target object within the game program.

2. The method according to claim 1, wherein the game program outputs a disturbance object on the touch screen.

3. A method of unlocking an information device in which a touch screen is used as an input-output means, the method comprising the steps of:
    releasing a blackout state of a touch screen and executing by a controller a game program while the information device remains in a locking state;
    outputting, by the controller, the game program with a movable object and a driving object and setting a target object on the touch screen;
    modifying the driving object and moving the movable object of the game program according to a variable series of user specific handling signals input into the information device by a gesture performed on the touch screen; and
    by the controller, the locking state of the corresponding information device if the movable object moves according to handling of the driving object and arrives at the target object; and
    releasing, by the controller, the locking state of the corresponding information device based on user identification and engagement of an override mechanism disposed on a specific area within the game program displayed on the touch screen without completion of the input of the variable series of user specific handling signal that indicates that the moveable object arrives at the target object.

4. The method according to claim 3, wherein the game program outputs a disturbance object on the touch screen.

5. A method of unlocking an information device in which a touch screen is used as an input-output means, the method comprising the steps of:
    releasing a blackout state of a touch screen and executing a game program by a controller, while the information device remains in a locking state;

outputting by the controller, the game program with unit objects on the touch screen;

a variable series of user specific handling signals input into the information device by a gesture performed on the touch screen by the game program; by the controller, the locking state of the corresponding information device if an assembly of the unit objects moved, rotated, or inverted according to the input of the variable series of user specific handling signals that satisfies a target state; and releasing, by the controller, the locking state of the corresponding information device based on user identification and engagement of an override mechanism disposed on a specific area within the game program displayed on the touch screen without completion of the input of the variable series of user specific handling signal that indicates that the moveable object arrives at the target object.

6. The method according to claim 5, wherein the game program outputs a disturbance object on the touch screen.

7. The method according to claim 1, wherein the variable series of a user specific handling signals include a combination of different hand signal including a drag, a tap or a flick.

8. The method according to claim 3, wherein the variable series of a user specific handling signals include a combination of different hand signal including a drag, a tap or a flick.

9. The method according to claim 5, wherein the variable series of a user specific handling signals include a combination of different hand signal including a drag, a tap or a flick.

* * * * *